(12) United States Patent
Sivanesan et al.

(10) Patent No.: US 9,652,366 B2
(45) Date of Patent: May 16, 2017

(54) CODE CHANGE ANALYSIS TO OPTIMIZE TESTING LIFECYCLE

(71) Applicant: HCL Technologies Ltd., Noida, Uttar Pradesh (IN)

(72) Inventors: Arivukarasu Sivanesan, Tamil Nadu (IN); Johnson Selwyn, Tamil Nadu (IN); Dhanyamraju S U M Prasad, Andhra Pradesh (IN); Vivek Rangi, Uttar Pradesh (IN); Sanjay Kumar Yadava, Noida (IN)

(73) Assignee: HCL Technologies Ltd., Noida (IN)

( * ) Notice: Subject to any disclaimer, the term of this patent is extended or adjusted under 35 U.S.C. 154(b) by 0 days.

(21) Appl. No.: 14/957,508

(22) Filed: Dec. 2, 2015

(65) Prior Publication Data

US 2016/0162386 A1 Jun. 9, 2016

(30) Foreign Application Priority Data

Dec. 4, 2014 (IN) .......................... 3539/DEL/2014

(51) Int. Cl.
*G06F 9/44* (2006.01)
*G06F 11/36* (2006.01)

(52) U.S. Cl.
CPC ...... *G06F 11/3684* (2013.01); *G06F 11/3672* (2013.01); *G06F 8/71* (2013.01)

(58) Field of Classification Search
None
See application file for complete search history.

(56) References Cited

U.S. PATENT DOCUMENTS 8,473,916 B2 * 6/2013 Venkatraman ...... G06F 11/3664
717/124
8,584,100 B2 11/2013 Xu et al.
8,806,450 B1 * 8/2014 Maharana ........... G06F 11/3688
717/133

OTHER PUBLICATIONS

Walt Stoneburner "Software Configuration Management and Version Control", 25 pages, 1997.

* cited by examiner

*Primary Examiner* — Qamrun Nahar
(74) *Attorney, Agent, or Firm* — Knobbe Martens Olson & Bear LLP (57) ABSTRACT

The present disclosure relates to system(s) and method(s) for detecting change in software code of elements in a current version associated with a software application as compared to a reference version of the software application. The system and method further determines whether the change in the software code of the elements is a functional change or a non-functional change. The system and method also provides an optimized test suite for testing the current version of the software application, in order to test the elements with functional change, in the current version.

9 Claims, 3 Drawing Sheets

CODE CHANGE ANALYSIS TO OPTIMIZE TESTING LIFECYCLE

CROSS-REFERENCE TO RELATED APPLICATIONS AND PRIORITY

The present application claims benefit from Indian Complete Patent Application No. 3539/DEL/2014, filed on Dec. 4, 2014, the entirety of which is hereby incorporated by reference.

TECHNICAL FIELD

The present disclosure in general relates to the field of software testing. More particularly, the present invention relates to a system and method to generate optimized test suite based on change in software code of a software application.

BACKGROUND

Now-a-days, Information Technology (IT) Organizations are developing new strategies for developing software applications in less time. Rapid Time-to-market to new features, development of complex and larger applications and change in software project execution model like Agile has resulted in short release cycles. Many IT organizations are now adopting agile software development strategy in order to develop software's in less time and deliver the developed software to their clients each time with an updated version. The clients may suggest modifications in the present release of the developed software and accordingly these changes are incorporated in the next sprint.

Hence, software development cycles have moved towards frequent releases increasing the challenge of releasing a high quality software build in short development lifecycles. However, releasing high quality software build on time in case of manual testing has become a challenge for IT Organizations. Automated test also face similar challenges as that of the manual testing efforts. Product Testing is mostly a recursive process and it turns out to be a very huge effort when the product is tested wholly during each iteration cycle. Further, when the releases are made in short cycle, completing the testing on time and with the required quality gets tough. Very often testing is not completed on time.

In order to reduce the testing efforts, some of the IT Organizations adopt to change based analysis on the current release of the software application or optimizing the test suite through source code change analysis are some of the key scientific methodologies for optimizing the test suite. There are a few methods that provide an optimized test suite through source code change analysis to determine the impacting test cases for testing the new release. However, methodologies that follow the source code change analysis also have gap/less accuracy in reporting impacted and un-impacted test cases. The source code change analysis and test case impact analysis lead to a very longer wait time to get the report, especially when the builds are very huge. Method used for test suite optimization includes storing each of the builds and test case traceability information which increases the storage unnecessarily storing redundant information. Due to this constraint, an optimized way of storing is desired to provide an optimized test suite with short analysis time and with good quality release of the application under testing.

SUMMARY

This summary is provided to introduce aspects related to systems and methods for optimizing a test suite for testing a software application and the aspects are further described below in the detailed description. This summary is not intended to identify essential features of the claimed subject matter nor is it intended for use in determining or limiting the scope of the claimed subject matter.

In one embodiment, a method to optimize a test suite associated with a software application is disclosed. Initially, a reference version and a current version of a software code associated with the software application are accepted. In the next step, a first set of test cases and a set of code coverage reports, wherein each code coverage report from the set of code coverage reports corresponds to a test case from the first set of test cases is accepted, and wherein the first set of test cases are configured to test the software code of the reference version. Further, the current version is compared with the reference version in order to identify a first set of elements of the software code that are modified in the current version. Once the first set of elements are identified, each of the code coverage reports is analyzed to identify correlation between the first set of test cases and the first set of elements. In the next step, the modification associated with the first set of elements is analyzed to identify elements with a functional change and elements with a non-functional change in the software code. Further, the elements with functional change are stored as a second set of elements. Based on the second set of elements with the functional change, a second set of test cases are identified from the first set of test cases. In the next step, an optimized test suite comprising the second set of test cases is generated for testing the software application.

In one embodiment, a system comprising a memory and a processor configured to optimize a test suite associated with a software application is disclosed. Initially, a reference version and a current version of a software code associated with the software application are accepted. In the next step, a first set of test cases and a set of code coverage reports, wherein each code coverage report from the set of code coverage reports corresponds to a test case from the first set of test cases is accepted, and wherein the first set of test cases are configured to test the software code of the reference version. Further, the current version is compared with the reference version in order to identify a first set of elements of the software code that are modified in the current version. Once the first set of elements are identified, each of the code coverage report is analyzed to identify correlation between the first set of test cases and the first set of elements. In the next step, the modification associated with the first set of elements is analyzed to identify elements with a functional change and elements with a non-functional change in the software code. Further, the elements with functional change are stored as a second set of elements. Based on the second set of elements with the functional change, a second set of test cases are identified from the first set of test cases. In the next step, an optimized test suite comprising the second set of test cases is generated for testing the software application.

In one embodiment, a computer program product having embodied computer program to optimize a test suite associated with a software application is disclosed. The computer program product comprising a program code for accepting a reference version and a current version of a software code associated with the software application. The computer program product further comprises a program code for accepting a first set of test cases and a set of code coverage reports, wherein each code coverage report from the set of code coverage reports corresponds to a test case from the first set of test cases, and wherein the first set of test cases are configured to test the software code associated with the reference version. Further, computer program product comprises a program code for comparing the current version with the reference version in order to identify a first set of elements of the software code that are modified in the current version. The computer program product further comprises a program code for analysing each of the code coverage reports to identify correlation between the first set of test cases and the first set of elements. The computer program product further comprises a program code for analysing the modification associated with the first set of elements to identify elements with a functional change and elements with a non-functional change in the software code. The computer program product further comprises a program code for storing the elements with the functional change as a second set of elements and identifying a second set of test cases from the first set of test cases based on the second set of elements. The computer program product further comprises a program code for generating an optimized test suite comprising the second set of test cases for testing the software application.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter relates to a system for detecting change in software code associated with elements in a current version of a software application as compared to software code associated with elements in a reference version of the software application. The system and method further determines whether the change in the software code associated with the elements is a functional change or a non-functional change. The system and method also provides an optimized test suite for testing the current version of the software application, in order to test the elements with the functional change, in the current version.

While aspects of described system and method for determining the optimized test suite to test the software application may be implemented in any number of different computing systems, environments, and/or configurations, the embodiments are described in the context of the following exemplary system.

Figure 1:
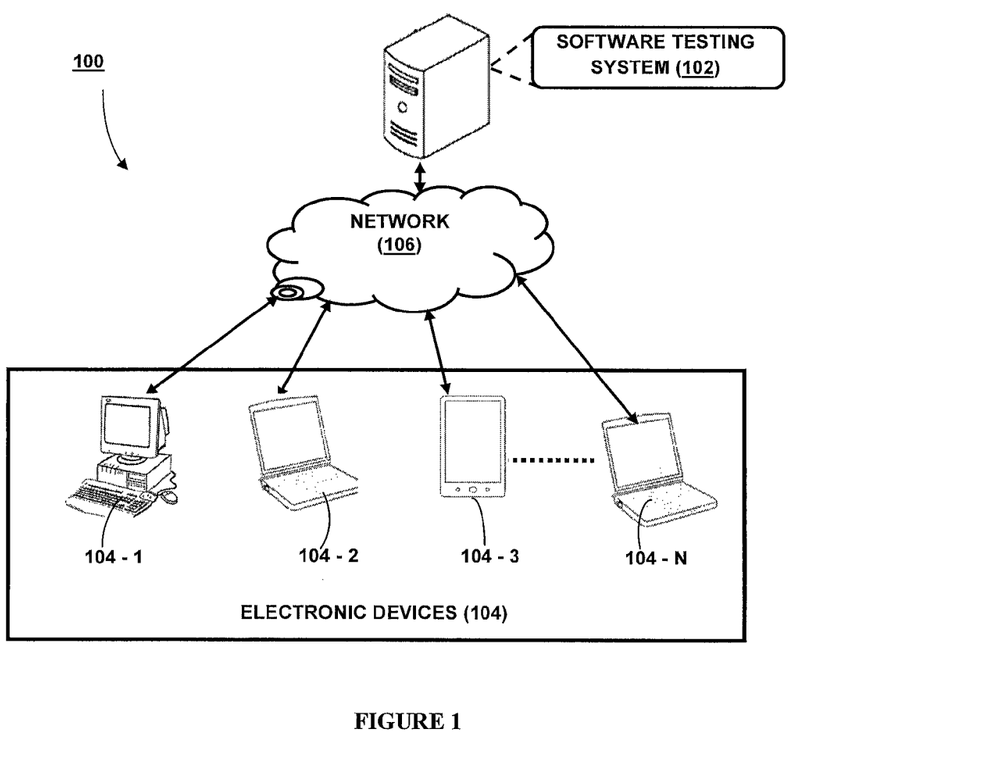
FIG. 1 illustrates a network implementation of a software testing system for generating an optimized test suit to test a software application, in accordance with an embodiment of the present subject matter.

Referring now to FIG. 1, a network implementation 100 of a software testing system 102 to optimize test suite for testing the software application is illustrated, in accordance with an embodiment of the present subject matter. In one embodiment, the software testing system 102 enables accepting a reference version and a current version of a software code associated with the software application. The software testing system 102 is further enabled to accept a set of code coverage reports, wherein each code coverage report from the set of code coverage reports corresponds to a test case from a first set of test cases, wherein the first set of test cases are configured to test the software code associated with the reference version. Further, software testing system 102 is enabled to compare the current version with the reference version in order to identify a first set of elements of the software code associated with the reference version that are modified in the current version. Once the first set of elements are identified, the software testing system 102 analyses the set of code coverage reports to identify correlation between test cases from the first set of test cases and the first set of elements. Further, the software testing system 102 analysis the modifications associated with the first set of elements to identify elements with a functional change and elements with a non-functional change in the software code, wherein the elements with the functional change are stored as a second set of elements in a repository of the software testing system 102.

Based on the second set of elements with functional change, a second set of test cases are identified from the first set of test cases, and accordingly an optimized test suite comprising the second set of test cases is generated for testing the current version of the software application.

Although the present subject matter is explained considering that the software testing system 102 is implemented on a server, it may be understood that the software testing system 102 may also be implemented in a variety of computing systems, such as a laptop computer, a desktop computer, a notebook, a workstation, a mainframe computer, a server, a network server, and the like. In one implementation, the software testing system 102 may be implemented in a cloud-based environment. It will be understood that the software testing system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the software testing system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
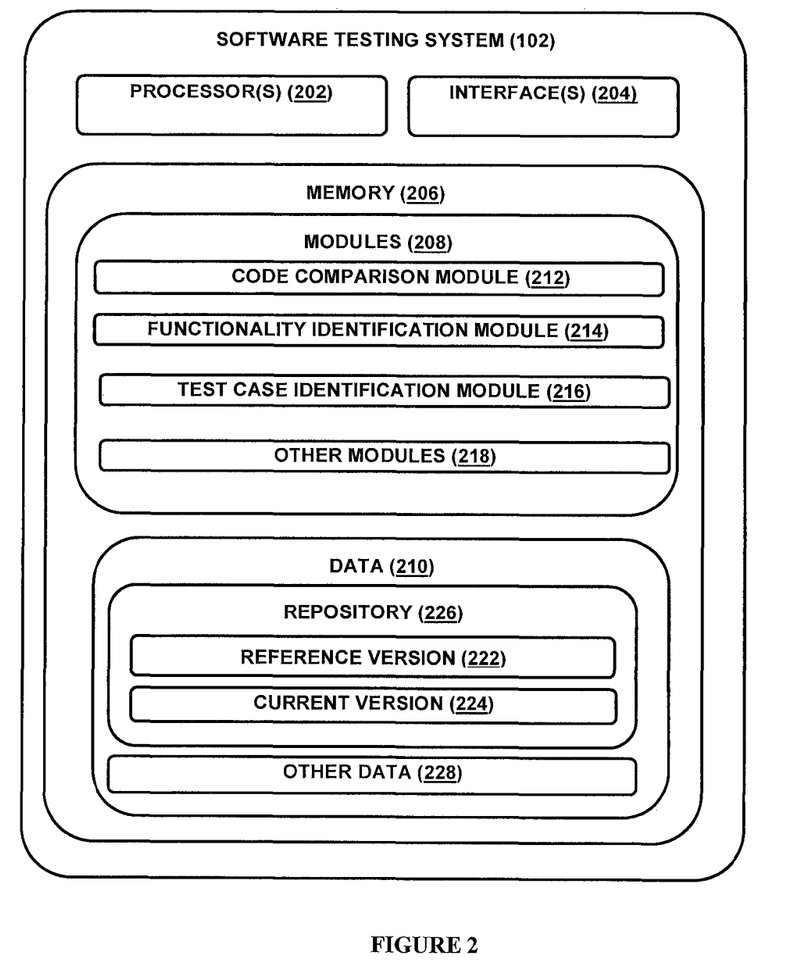
FIG. 2 illustrates the software testing system, in accordance with an embodiment of the present subject matter.

Referring now to FIG. 2, the software testing system 102 is illustrated in accordance with an embodiment of the present subject matter. In one embodiment, the software testing system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the software testing system 102 to interact with a user directly or through the client devices 104. Further, the I/O interface 204 may enable the software testing system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a code comparison module 312, a functionality identification module 314, a test case identification module 316, and other modules 218. The other modules 218 may include programs or coded instructions that supplement applications and functions of the software testing system 102.

The data 210, amongst other things, serves as a repository for storing data processed, received, and generated by one or more of the modules 208. The data 210 may also include a repository 226, and other data 228. In one embodiment, the repository 226 may be configured to store a reference version 222 and a current version 224 associated with the software application. The reference version 222 is a software build of the software application that has been already tested, whereas the current version 224 is a latest software build of the software application which is yet to be tested. In one embodiment, the test cases are prioritized for testing the current version 224 so that the testing of the software application can be completed in shorter cycle time. In one embodiment, the reference version 222 may be a software build selected from the collection of software builds of the software application that is already tested, whereas the current version 224 is a software build that is to be tested using the test cases applicable to the reference version 222. In one embodiment, the user is provided an option to choose a software build selected from the collection of software builds as the reference version 222 and the current version 224 for the purpose of test suite optimization. Alternatively, the process of test suite optimization may be triggered by the software testing system 102 whenever a new version of the software application is available. In case of an automated system, the selection of the reference build from the reference versions 222 may be through a pre-defined rule that always chooses the last software build that was already tested and stored as the reference version 222 for the purpose of test suite optimization. The software testing system uses difference between software code associated with the reference version 222 and the current version 224 for generating the optimized test suite.

In one embodiment, the other data 228 may include data generated as a result of the execution of one or more modules in the other module 218. In one implementation, at first, a user may use the client device 104 to access the software testing system 102 via the I/O interface 204. The user may register using the I/O interface 204 in order to use the software testing system 102. In one embodiment, once the user registers to the software testing system 102, the user may send a software build as input to the software testing system 102. The software build is dis-assembled using a dis-assembler at the software testing system 102.

In the next step, the dis-assembled software build is parsed to extract elements associated with the software application like the package name, class name, methods, and the like, wherein the extraction is based on software development languages used to develop the software application. For example, if the software development language is identified as Java, then the elements such as modules, packages, classes, methods and lines are identified from the software build. If the software application is a structured language like 'C', then the elements such as the modules, methods and the lines of code are extracted. In the next step, a check is made to identify whether, the software build is a first version or an updated version of the software build, based on the information stored at the repository 226 of the software testing system 102. If the software build is identified as the first version, then the parsed details of the software build are stored as a reference version 222 in the repository 226. In one embodiment, all the software builds that are received as input from the user devices 104 and are already tested by the software testing system 102 are stored as reference version 222 in the repository 226. Further, the set of code coverage reports corresponding to the reference version 222 is also accepted and stored in the repository 226. Accordingly, all the associated information of the reference version 222 is stored in the repository 226. For instance, if the software build is written in programming language Java, the relationship is maintained between module and its packages, each package and its classes and so on and so forth.

In one embodiment, if the software build is identified as a new version that is to be tested, the software build is stored in the repository 226, in the form of the current version 224. For storing the current version 224 in the repository, initially the difference between the software code of the current version 224 the corresponding reference versions 222 is identified by the code comparison module 212. The process of identifying the difference is initiated at a higher level of abstraction and is narrowed down towards lower levels of abstraction. For instance, initially the difference may be identified between elements such as module or a single executable file using a signature or timestamp that is suitable in order to identify code change quickly and reliably. Once the difference in the software code is identified at the module or the single executable file level, then the comparison analysis moves deeper into the module or single executable file for the next level of code change analysis. The module or the single executable files are further analyzed step-by-step at the package, class and the method level if an Object Oriented Programming Language (OOPL) is used for developing the application. If difference is not found, only pointers that points to the module of the previous builds are stored in the repository 226 as a current version 224. If the difference is identified, the corresponding element with change in software code is identified and stored in the repository 226 as the first set of elements associated with the current version 224.

In the next step, the difference in the software code associated with the first set of elements is analyzed by the functionality identification module 214 to identify whether the difference in software code impacts the functionality of the element from the first set of elements. In one embodiment, if the difference in software code is identified at the method level, the difference is first analyzed to verify if the difference impacts the functionality. A second set of elements is identified from the first set of elements, wherein the second set of elements stores all the elements from the first set of elements with change in functionality. The process of identifying the change in functionality to identify the second set of elements is further explained as below by way of an example.

In the software code of a method element in the reference version 222 and the current version 224 is represented as:
Reference Versions 222:

```
switch (n) {
case 1: { statements; break; }
case 2: { statements; break; }
}
Current version:
switch (n) {
case 2: { statements; break;}
case 1: { statements; break; }
}
```

In the above example, there is a change in the location of 'case' blocks in current version 224 as compared to the reference versions 222. However, since the switch block receives only one input, and not an array, only one set of case statements are executed to test the switch block. Further, both the blocks have a 'break' statement at the end of the block that ensures that flow of the functionality does not continue to the next block. Hence, no change in functionality is identified in this element from the first set of element of the reference versions 222 and the current versions 224. Few other examples of change in code but no change in functionality of the element may be identified as:
i. Change in position of 'if/else-if' blocks
ii. change in position of the values, identifiers and/or sub-expressions in an expression that does not affect the functionality, or position change in the variable in an expression/sub-expression that has 'plus' or a 'multiplier' operator
iii. Deletion of a dummy variable that had no functionality
iv. encapsulation of public fields to get/set their values In another example, when the comparison of software code is done at the method level, in case of object oriented languages like C++, Java, the method is additionally analyzed to identify if the method is overridden. In case if the method is found overridden, this overridden method is stored in the current version 224, with a flag indicating that the method is overridden. The flag is referred during the test case impact analysis to perform the analysis accurately. The process of identifying function overriding in the method is explained using the following code of the class element:

```
Reference versions 222:
MyClass_Base{
    void func1( );
}
```

-continued

```
MyClass_Base::func1( ) {
    statement-1;
}
MyClass_Derived : public MyClass_Base {
}
{
    MyClass_Derivedm_class;
    m_class.func1( );
}
Current version 224:
MyClass_Base{
    void func1( );
}
MyClass_Base::func1( ) {
    statement-1;
}
MyClass_Derieved : public MyClass_Base {
    void func1( );
}
MyClassDerived::func1( ) {
    statement-2;
    statement-3;
}
{
    MyClass_Derivedm_class;
    m_class.func1( );
}
```

In the above example, func1( ) is available only in the base class of the reference version 222, However, the func1( ) is overridden in the current version 224, since the function is available in both the base and the derived class in the current version 224. As a result when m_class.func(1) is called in the current version 224, functionality defined in the overridden method is executed. Due to this, body of MyClass_Base::func1( ) of reference version 222 in this case is compared with body of MyClass_Derived::func1( ) in the current version 224.

In one embodiment, for software development languages like C++ where multiple inheritance (example: public MyClass: public ClassA, public ClassB, public ClassC) is allowed, one child class can have more than one parent class, the source code is analyzed for which parent definition of the method is invoked.

Accordingly, in other cases, where there is functional change between versions of each method, complete information of the method element is stored which includes the module name, its body and its parent levels module, in the second set of elements. Once the second set of elements is identified, a second set of test cases that are applicable to the second set of elements are identified from the first set of test cases. The second set of test cases applicable to the second set of elements may be identified based on the set of code coverage reports accepted by the system form the user device 104 or the development platform. Each of the code coverage report stores information about the software code covered for testing by each test case from the first set of test cases.

In one embodiment if the testing environment of the software application supports code coverage tool, an instrumented build may be produced using any of the code coverage tool as part of the build process, for the testing team to test the functional requirements of the reference version 222. For this purpose, just before the start of a test case, the code coverage capture is initiated by the code coverage tool. Once all the steps of the test case are executed, the code coverage tool generates a code coverage report, wherein the code coverage report corresponding to the selected test case from the first set of test case. In the next step, the report is exported to an understandable form like html/xml/text format such that a user from the testing team can understand the code covered under each test case. In a similar manner, all the test cases from the first set of test cases are executed with the code coverage tool to generate the set of code coverage reports, wherein each code coverage report from the set of code coverage reports corresponds to a test case from the first set of test cases. Each of the code coverage report contains the details of elements such as package name, class name, method name, lines of source and whether each of the elements were executed or not during an execution of the software application under testing. These details are listed in a structured fashion. For example, all the methods that belong to a particular class are listed under that class and so on. Further, all the lines/methods/class/package/file marked as executed are only traced against this particular test case. In case of automated test cases, scripts can be included as part of the test execution scripts to inform the code coverage tool when to initiate and stop the code coverage capture. Further, each of the code coverage report may be named with the test case ID or test case name of the test case executed to maintain the relationship between the test case and the corresponding code covered by its execution. With this information, test case-to-elements traceability is established. This process is repeated for all the test cases that are executed against the reference versions 222. Traceability reports that are captured for all the test cases are uploaded, again through the I/O interface 204. Based on the code coverage analysis, the second set of test cases applicable to second set of elements are identified from the first set of test cases.

The granularity level at which the source code is to be analyzed is accepted from the user. In one embodiment, the granularity may be identified as module, package, class, method, block or line-level. If the granularity is maintained at the very low level, that is, at the line level, then impact analysis processing time and data storage requirement is high. However, maximum accuracy of the impact analysis is achieved. If the granularity of the traceability is chosen at the method level or above, then the impact analysis processing time and the information storage requirement are low compared to line level granularity. However, the accuracy of the impact analysis is also reduced.

In one embodiment, already generated set of code coverage reports for all the executed first set of test cases, is uploaded through the I/O interface 204 and are parsed to identify coverage parts based on the level of the granularity chosen by the user. For example, if the method level granularity is selected then all the methods that are executed at least once are identified from the code coverage report, however, block and line coverage are ignored. Once the coverage parts that got executed at least once are identified, the sections stored already as part of the build upload are identified from the repository 226. Pointers to those storage locations are collected and stored against that particular test case in the repository 226 instead of storing the contents, in order to reduce the storage space and also speeds up the analysis process for reporting.

In one embodiment, based on the elements with functionality change, the software testing system 102 identifies the impacted test cases from the first set of test cases to test the second set of elements. Finally, a detailed report is generated with all the second set of test cases and corresponding elements from the second set of elements that are applicable to the second set of test case.

This report generated may be used by testers to prioritize and test the second set of test cases against the second set of elements from the current version 224. Alternatively, if the test cases are automated, an automation engine can pick up second set of test case to test the functionality of the second set of elements.

Figure 3:
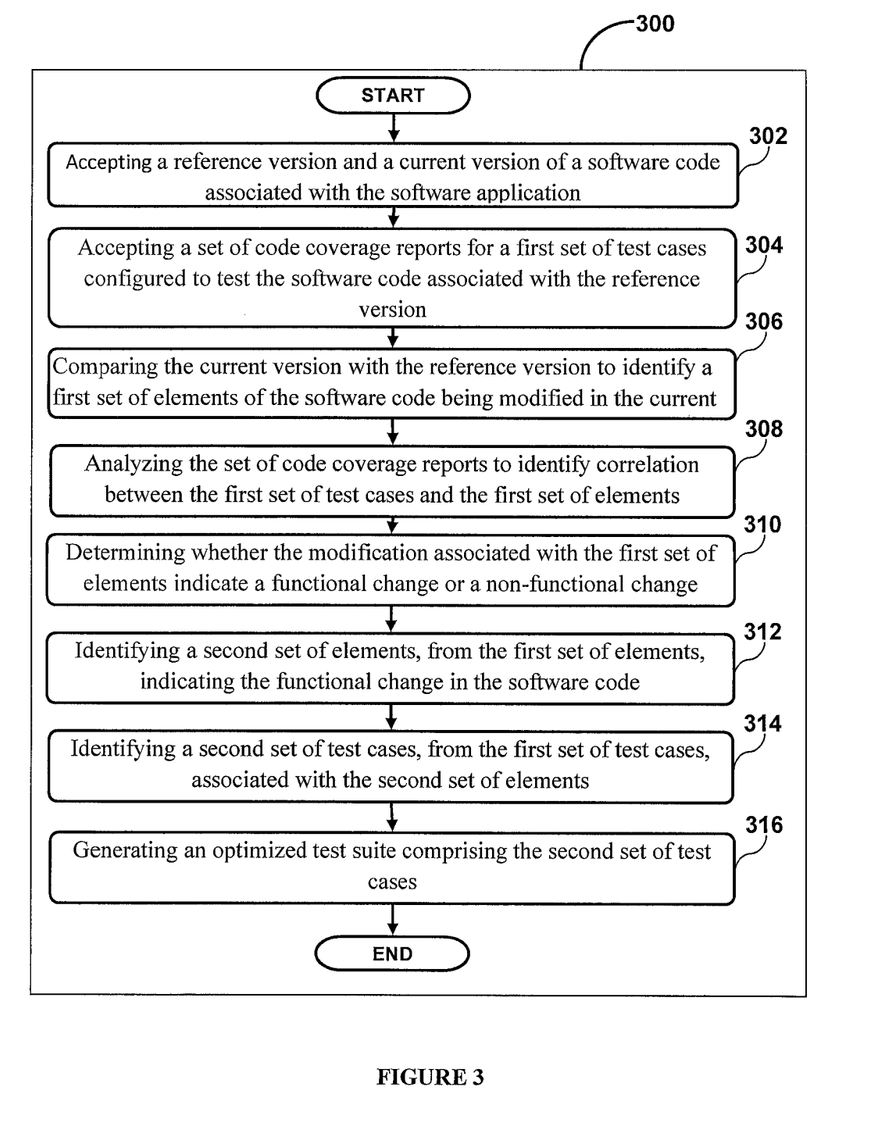
FIG. 3 illustrates a flowchart to enable the software testing system for generating an optimized test suit to test the software application, in accordance with an embodiment of the present subject matter.

Referring now to FIG. 3, a method 300 for generating an optimized test suite for testing the software application is disclosed, in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described software testing system 102.

At block 302, the reference version 222 and the current version 224 of a software code associated with the software application is accepted by the software testing system 102 for the developer platform or the user device 104. In one embodiment, all the reference versions associated with the software application may be accepted and maintained as reference version 222 at the repository 226 using a version controlling tool.

At block 304, set of code coverage reports corresponding to each test case from the first set of test cases is accepted from the developer platform or the user devices 104. Each code coverage report summarizes the software code covered by each corresponding test case from the first set of test cases, for testing the elements in the reference version 222. In one embodiment, a code coverage tool may be used for capturing the elements of the reference version, that are executed as part of a particular test case getting executed and accordingly the code coverage report corresponding to the particular test case from the first set of test cases is generated. Further, traceability between the test cases from the first set of test cases and the elements in the reference version can be performed at a line, a method or other higher levels depending on the accuracy level expected by the user. In one embodiment, the elements associated with the reference version 222 may remain the same. However, some of the elements associated with the reference version 222 may be changed by a software developer in the current version 224 of the software code associated with the software application.

At block 306, the current version 224 of the software application is compared with the reference version 222 of the software application to identify a first set of elements associated with the software code of reference version 222 that are modified in the current version 224. In one embodiment, the software code from the reference version 222 and the current version is analyzed line by line and accordingly the first set of elements with change in code are identified from the reference version of the software code.

At block 308, the set of code coverage reports is analyzed to identify correlation between the test cases from the first set of test case and the first set of elements. In one embodiment, the code comparison module 212 is configured to analyze each element from the first set of elements and accordingly correlate each test case from the first set of test cases with the elements from the first set of elements.

At block 310, the modification associated with the first set of elements is analyzed by the functionality identification module 214 in order to identify whether the modification generates a functional change or a non-functional in the element of the first set of elements.

At block 312, a second set of elements are extracted from the first set of elements wherein, all the elements in the second set of elements are indicative of a functional change in the software code associated with these elements.

At block 314, a second set of test cases is identified from the first set of test cases. In one embodiment, each test case from the first set of test cases is at least associated with one element from the second set of elements.

At block 316, an optimized test suit is generated from the second set of test cases identified at block 314.

The exemplary embodiments discussed above may provide certain advantages. Though not required to practice aspects of the disclosure, these advantages may include those provided by the following features.

Some embodiments enable a system and a method to reduce the test cycle time by identification of an optimized test suite based on the change in code in the current version as compared to the reference version.

Some embodiments enable the system and the method that can optimize the storage space by incremental storage of the software application versions.

Some embodiments enable the system and the method for determining the exact portion of software code that has undergone functionality change, using the set of code coverage reports.

Some embodiments enable the system and the method for accurate change analysis by analysing the software application versions at the build level.

Although implementations for methods and systems to determine optimized test suite for testing a software application have been described in language specific to structural features and/or methods, it is to be understood that the appended claims are not necessarily limited to the specific features or methods described. Rather, the specific features and methods are disclosed as examples of implementations for determining optimized test suite for testing the software application.

We claim:

1. A method for optimizing a test suite associated with a software application, the method comprising:
   accepting
      a reference version and a current version of a software code associated with a software application, and
      a first set of test cases and a set of code coverage reports, wherein the first set of test cases are configured to test the software code associated with the reference version, wherein each code coverage report from the set of code coverage reports corresponds to a test case from the first set of test cases;
   comparing the current version with the reference version in order to identify a first set of elements of the software code being modified in the current version;
   analyzing the set of code coverage reports to identify correlation between the test cases from the first set of test cases and the first set of elements;
   determining whether the modification, in the current version, associated with the first set of elements indicate a functional change or a non-functional change in the software code;
   identifying a second set of elements, from the first set of elements, indicating the functional change in the software code;
   identifying a second set of test cases, from the first set of test cases, associated with the second set of elements; and
   generating an optimized test suite comprising the second set of test cases,
   wherein the second set of test cases are prioritized based on the impact generated by the functionality change associated with the second set of elements in the current version.

2. The method of claim 1, wherein the reference version and the current version is an executable file in the form of a software build, wherein the software build is generated from corresponding versions of the source code of the software application, wherein the current version is to be tested using at least one test case from the first set of test cases.

3. The method of claim 1, wherein the first set of elements associated with the reference version and the current version may include at least one of a module, a package, a class, a method, and a method body.

4. The method of claim 1, wherein an element in the reference version is compared with a corresponding overridden element in the current version in order to determine change in functionality, when the modification in software code of the element is identified as a function overriding.

5. The method of claim 1, wherein the reference version and current version are maintained using a version controlling tool, wherein the version controlling tool maintains software code associated with elements with functionality change and pointers to rest of the elements.

6. The method of claim 1, wherein the functional change is determined at different levels of software code including a line level change, a method level change, or a class level change, based on the coverage and accuracy required for determining the second set of elements.

7. The method of claim 1, wherein the functional change in the software code is determined using development languages used for developing the software application.

8. A system for optimizing a test suite associated with a software application, the system comprising:
   a memory and a processor coupled to the memory, wherein the processor is configured to perform the steps of:
   accepting
      a reference version and a current version of a software code associated with a software application, and
      a first set of test cases and a set of code coverage reports, wherein the first set of test cases are configured to test the software code associated with the reference version, wherein each code coverage report from the set of code coverage reports corresponds to a test case from the first set of test cases;
   comparing the current version with the reference version in order to identify a first set of elements of the software code being modified in the current version;

analyzing the set of code coverage reports to identify correlation between the first set of test cases and the first set of elements;

determining whether the modification, in the current version, associated with the first set of elements indicate a functional change or a non-functional change in the software code;

identifying a second set of elements, from the first set of elements, indicating the functional change in the software code;

identifying a second set of test cases, from the first set of test cases, associated with the second set of elements; and generating an optimized test suite comprising the second set of test cases, wherein the second set of test cases are prioritized based on the impact generated by the functionality change associated with the second set of elements in the current version.

9. A computer program product having embodied thereon a computer program to optimize a test suite associated with a software application, the computer program product comprising:

a program code for accepting a reference version and a current version of a software code associated with a software application;

a program code for accepting a first set of test cases and a set of code coverage reports, wherein the first set of test cases are configured to test the software code associated with the reference version, wherein each code coverage report from the set of code coverage reports corresponds to a test case from the first set of test cases a program code for comparing the current version with the reference version in order to identify a first set of elements of the software code being modified in the current version;

a program code for analyzing the set of code coverage reports to identify correlation between the first set of test cases and the first set of elements;

a program code for determining whether the modification, in the current version, associated with the first set of elements indicate a functional change or a non-functional change in the software code;

a program code for identifying a second set of elements, from the first set of elements, indicating the functional change in the software code;

a program for identifying a second set of test cases, from the first set of test cases, associated with the second set of elements; and a program code for generating an optimized test suite comprising the second set of test cases, wherein the second set of test cases are prioritized based on the impact generated by the functionality change associated with the second set of elements in the current version.

* * * * *